March 26, 1940. J. T. HUME Re. 21,409

CABINET WASHING MACHINE

Original Filed July 5, 1934 3 Sheets-Sheet 1

Inventor: John T. Hume
By: George I. Wright
Atty.

March 26, 1940. J. T. HUME Re. 21,409

CABINET WASHING MACHINE

Original Filed July 5, 1934 3 Sheets-Sheet 2

Inventor
John T. Hume
By: George S. Haight
Atty.

March 26, 1940. J. T. HUME Re. 21,409

CABINET WASHING MACHINE

Original Filed July 5, 1934 3 Sheets-Sheet 3

Inventor:
John T. Hume.
By: George S. Wright
Atty.

Reissued Mar. 26, 1940

Re. 21,409

UNITED STATES PATENT OFFICE 21,409

CABINET WASHING MACHINE

John T. Hume, Gulfport, Miss., assignor to Electric Household Utilities Corporation, Chicago, Ill., a corporation of Illinois Original No. 2,088,704, dated August 3, 1937, Serial No. 733,740, July 5, 1934. Application for reissue September 6, 1938, Serial No. 228,624

12 Claims. (Cl. 68—133)

My invention relates to improvements in domestic washing machines.

One of the objects of my invention is to enclose the washing machine and operating mechanism within an ornamental cabinet and to mount the parts in a manner which properly supports the parts within the cabinet without the necessity of fastenings appearing on the exterior of the cabinet walls to mar the appearance; which distributes and cushions the load and strains to eliminate vibration and noise; which is constructed so as to definitely reduce the tendency of transmission of vibration and noise from the washing machine to the ornamental cabinet; which prevents leakage of water to the interior of the cabinet; which is relatively inexpensive to manufacture and adaptable to production methods of assembly of its parts; and which is readily adaptable to the use of porcelain enamel sheet metal for the cabinet walls without requiring a special framework therefor.

Other objects of the invention will appear from the following description and the accompanying drawings which illustrate one embodiment of the invention.

Referring to said drawings,

Fig. 3 is a plan sectional view on the line 3—3 of Fig. 2; and

Figure 1:
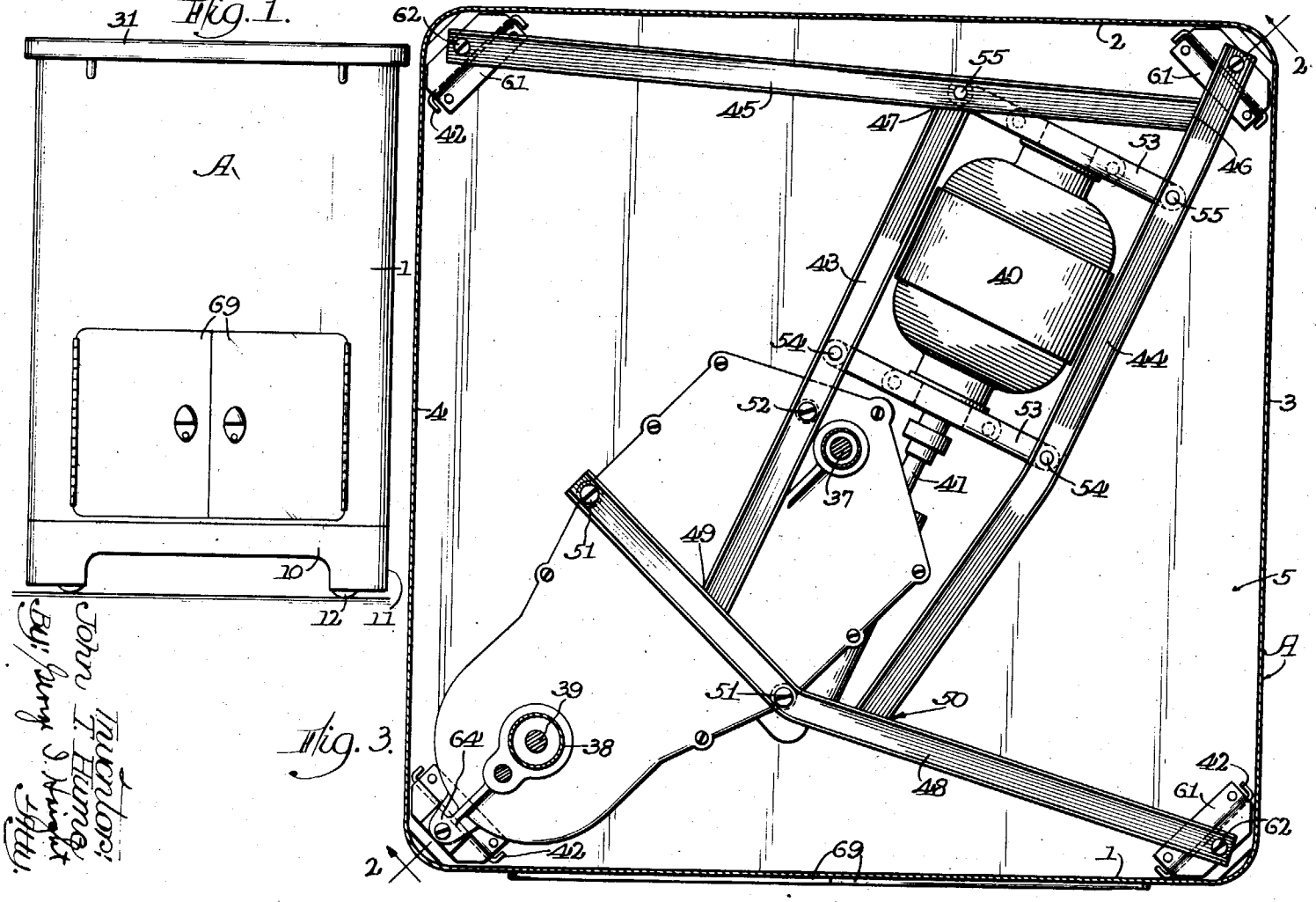
Fig. 1 is a front elevational view of the cabinet enclosure, showing the doors permitting access to the lower portion thereof.

The cabinet enclosure A is rectangular in shape and includes in general a front wall 1, rear wall 2, side walls 3 and 4, bottom wall 5, a top wall 6, and a removable cover 31 which forms a convenient table top for the structure when the washing machine is not in use. The front, rear and side walls are preferably made of porcelain enameled sheet metal and are formed as flat sheets with rounded margins forming the corners of the cabinet. These wall panels may be integrally joined at the corners and the margins covered by suitable ornamental mouldings as desired.

Figure 2:
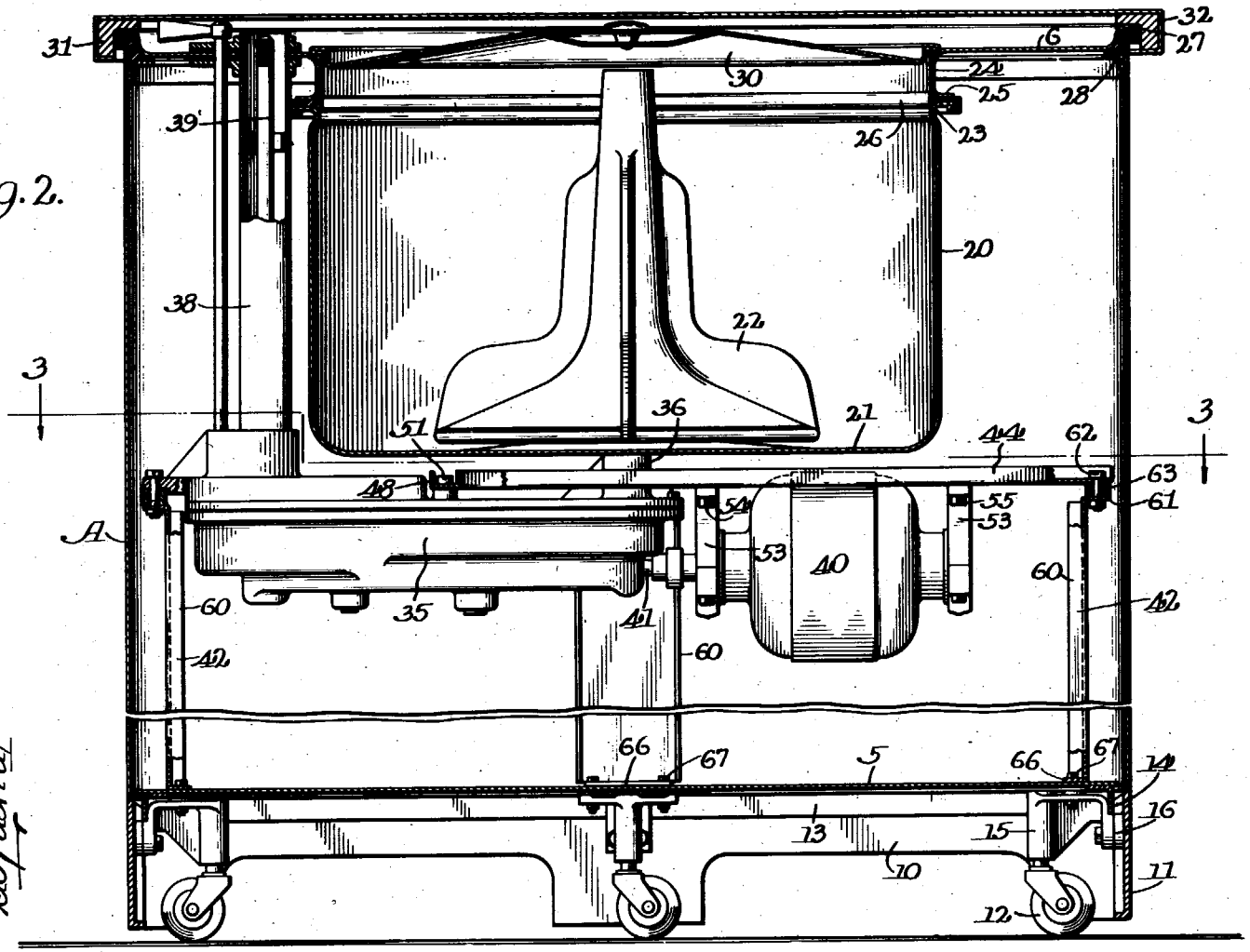
Fig. 2 is an enlarged vertical diagonal sectional view substantially on line 2—2 of Fig. 3, showing the cabinet and washing machine tub in section and other parts in elevation.

Around the bottom of the cabinet is a base structure constituting a part of a tub supporting frame to be described, which base structure includes depending side walls constituting a skirting 10 extended downwardly at the corners 11 to provide legs for the cabinet and to cover the rollers or casters 12 upon which the structure is supported so as to be readily portable. The skirting at its upper margin has a metal band 13 on its inner face and an angle member 14 surrounds this band and has its vertical flange secured thereto (Fig. 2). The horizontal flange of the angle iron 14 forms a support for the bottom wall 5 of the cabinet. The casters or rollers 12 are pivotally mounted in corner brackets 15 which are bolted to lugs 16 on the inner face of the skirting and which are formed to seat in the angle of the angle member 14. The lower edges of the front, rear and side walls of the cabinet rest upon the upper edges of the skirting around the base (Fig. 2). As will be later explained, the weight of the washing machine and operating parts is carried directly to the base structure at points above the caster brackets at the corners of the cabinet by means of a framework.

The washing machine is preferably positioned in substantially the center of the cabinet and comprises in general a cylindrical tub 20 having an open top and a flat bottom wall 21. An agitator 22 is centrally positioned within the tub and is operated through suitable mechanism from beneath the tub. The upper rim or margin 23 of the tub is beaded and provided with a horizontally outwardly turned flange. The top wall 6 of the cabinet has a central opening corresponding to the open top of the tub, and the marginal edge of said top wall around this opening is turned downwardly to form a neck portion 24, the lower edge 25 of which is turned outwardly and horizontally as a flange. A rubber ring 26 is positioned between these flanges 23 and 25 to form a complete seal which prevents the entrance of water into the cabinet and at the same time forms a resilient cushion which prevents vibration and noise from the washing machine being transmitted to the top wall 6.

The outer margin of the top wall 6 of the cabinet is formed to provide a raised bead 27 forming a channel or groove on its under side, which overlies the upper margin of the front, side and rear walls of the cabinet. A rubber gasket 28 is seated in this channel and is interposed between this channel and the upper edge of the cabinet walls. This rubber gasket keeps moisture from the interior of the cabinet and at the same time forms a cushion to prevent noise or vibration from the washing machine being transmitted to the cabinet walls.

The top wall 6 thus forms a shallow tray which serves to drain water back into the washing machine tub during the handling of the clothes. A removable lid or cover 30 is provided for the washing machine tub. This is in the form of a disc having its edges formed to rest in the neck portion 24 of the top wall 6. The cover 30, however, is arranged so that it does not project above the level of the outer marginal bead 27 of the top wall 6, so as to permit the use of the flat removable table top 31. This table top is in the form of a flat sheet of metal having its margins 32 turned downwardly and inwardly to form angularly extending flanges and is adapted to rest upon the marginal bead 27 of the top wall 6.

The washing machine operating mechanism may be of any suitable type for the purpose and is represented by the operating shaft 37 for the agitator 22, which shaft extends upwardly through the bottom of the tub. A suitable housing 35 is provided for the operating mechanism and is positioned beneath the tub and extends generally from substantially the center of the cabinet into one corner thereof. The housing has a hub or boss 36 adjacent its inner end, which bears against the bottom wall 21 of the tub and supports the tub, and the operating shaft 37 for the agitator extends through this hub and upwardly into the tub. At its other end, adjacent the corner of the cabinet, the housing has an upstanding tubular member 38 which encloses an operating shaft 39 extending to the top of the cabinet in position so that a wringer or other attachment may be mounted on top of the cabinet and operably connected with said shaft. The washing machine parts are driven by an electric motor 40, the shaft 41 of which extends into the housing 35.

Figure 4:
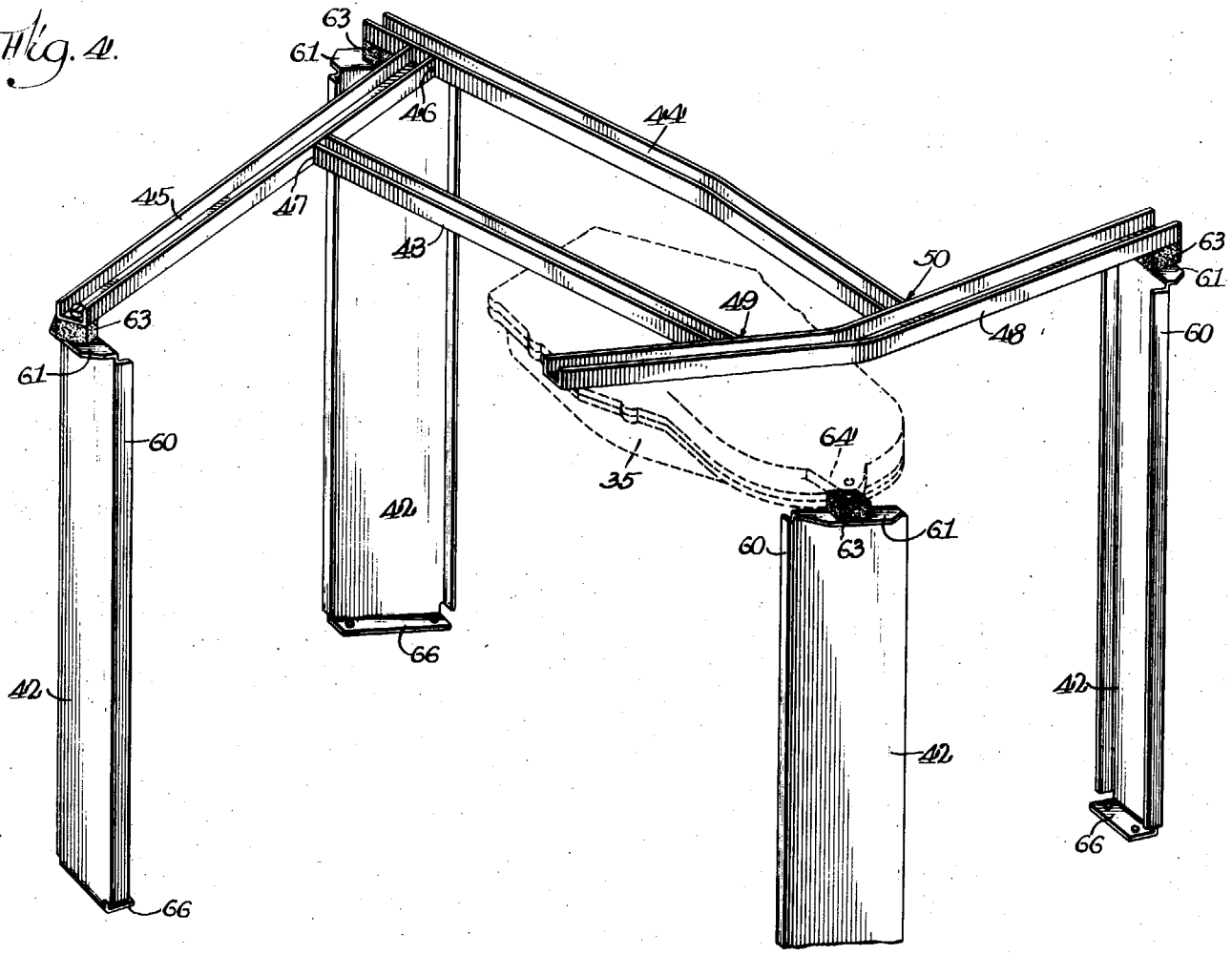
Fig. 4 is a skeleton perspective view of the related parts of the frame which supports the washing tube, the operating parts of the driving motor.

All of these operating parts are supported by means of a horizontally disposed framework which includes uprights 42 disposed in the corners of the cabinet. As shown more clearly in Figs. 3 and 4, this frame is made up of a series of channel members connected together in a manner to provide a substantial structure. Two channel members 43 and 44 are disposed diagonally of the cabinet and arranged in substantially parallel relation. The outer end of the channel member 44 extends to a corner of the cabinet and is connected to the upright 42 in that corner. Another channel member 45 extends at an angle to the members 43 and 44, and the outer end thereof is connected to the upright 42 in the corresponding corner of the cabinet. The other end of the member 45 is secured at 46 by welding or otherwise to the channel member 44 adjacent its outer end. The outer end of the channel member 43 is secured at 47 by welding to the channel member 45 at a point intermediate the ends of said member 45.

The inner ends of the channel members 43 and 44 are secured by welding to an angular channel member 48 at points 49 and 50 respectively. The outer end of the member 48 extends into another corner of the cabinet and is connected to the upright 42 in that corner. This member 48 is secured by the screws 51 to the housing 35 at points separated substantially the width of the housing. In addition to this, the member 43 is likewise secured by the screw 52 to the housing 35 adjacent the inner end thereof. In this manner the housing 35 becomes a part of the framework and serves as an extension of the frame to carry the support to the fourth corner upright 42. The driving motor 40 is mounted on cross hangers 53 which are hung from the under side of the frame and secured thereto, the inner hanger being bolted at its ends 54 to the channel members 43 and 44, and the outer hanger being likewise bolted at one end to the channel member 44 and at its other end to the channel member 45.

Thus it will be seen that the load is carried by the frame and the housing to the corners of the cabinet and is transferred directly to the supporting casters by means of the uprights 42. This enables the load to be supported directly by the four corners of the base independently of the walls of the cabinet, and since the interior mechanism of the washing machine is independent of the cabinet walls no fastenings of any character extend through the cabinet walls to mar the appearance thereof.

The uprights 42 are in the form of wide channel members, the marginal flanges 60 of which reinforce said uprights. The upper ends of the uprights have horizontally turned flanges 61 which are secured to the ends of the channel members of the frame by means of the bolts 62, and rubber cushions 63 are interposed between these flanges and the frame members to prevent the transmission of vibration to the uprights and thence to the cabinet. The housing 35 at its outer end has a lug 64 by which it is connected with the corresponding upright 42, and a resilient cushion 63 is likewise interposed between the upright and the lug. The lower ends of the uprights have in-turned flanges 66 which are secured by bolts 67 to the brackets 15 of the casters (Fig. 2), so that the load is supported directly by the brackets and casters.

This construction provides a clear, unobstructed compartment in the lower portion of the cabinet below the washing machine, which serves as suitable storage space for the wringer or other attachments when not in use. In order that access may be gained to this lower compartment of the cabinet, the front or rear walls 1 and 2 may be provided with openings covered by the hinged doors 69.

It is obvious that changes may be made in the construction, arrangement and operation of the parts, without departing from the spirit of the invention, and I contemplate such changes as fairly fall within the scope of the appended claims.

I claim:

1. The combination of a washing machine, a substantially rectangular cabinet having walls enclosing said washing machine, a frame within the cabinet for supporting said washing machine in engagement with one of the walls of said cabinet for supporting said cabinet, said frame including uprights disposed adjacent the corners of the cabinet, and a base structure constituting a part of said frame and spaced inwardly from said corners, said base structure being secured to and supporting the uprights independently of the side walls of the cabinet.

2. The combination of a washing machine, a substantially rectangular cabinet enclosing the machine and including front, rear and side walls, a frame within the cabinet supporting said washing machine and said cabinet and including horizontal members upon which said washing machine is mounted, said frame further including upright members respectively disposed substantially in the corners of said cabinet and spaced inwardly from the rear and side walls thereof, and supporting rollers for said frame disposed in the lower corners of the cabinet in substantial vertical alignment with and secured to the uprights for supporting the latter independently of the cabinet walls.

3. The combination of a substantially rectangular base having side walls and supporting casters and brackets for said casters disposed in the corners of and secured to said base, a substantially rectangular cabinet including walls supported on the side walls of said base outwardly of said brackets, a washing machine enclosed by the cabinet, and a frame within the cabinet for supporting the washing machine; said frame extending into the corners of the cabinet and spaced from the cabinet walls, said frame including upright members bearing upon and secured to said caster brackets, whereby said washing machine is directly supported by said frame and base independently of the cabinet walls.

4. The combination of a substantially rectangular cabinet including side walls and a bottom wall, a washing machine positioned within said cabinet and having a cylindrical tub, a top wall for the cabinet having an opening corresponding to the opening in the tub and bearing upon the upper rim of the tub, a frame within the cabinet disposed beneath and supporting the tub with the rim of the latter in bearing engagement with the said top wall, said frame being disposed above the bottom wall of the cabinet, a base for the cabinet including depending walls supporting the side and bottom walls of the cabinet, and means supported by the base and extending upward to and supporting said frame.

5. The combination of a substantially rectangular cabinet including vertical enclosing walls, a washing machine disposed within the cabinet and enclosed by said walls, a frame for supporting the washing machine including horizontal members each extending inwardly to one of three of the corners of said cabinet and spaced from the walls thereof, said frame further including a housing for enclosing the operating mechanism of the washing machine, said housing being secured at its inner end to one of said horizontal members and extending at its opposite end into the remaining corner of the cabinet and spaced from said vertical walls of the latter, said frame further including upright supporting members for the washing machine and housing, said upright supporting members being respectively disposed within the corners of the cabinet and spaced from the cabinet vertical walls, and means on said frame secured to and supporting said cabinet at the bottom thereof.

6. The combination of a substantially rectangular cabinet having vertical walls, a washing machine disposed within the cabinet walls, a frame for supporting the washing machine including a plurality of horizontally disposed members extending substantially to and spaced from three of the corners of said cabinet, said frame further including a horizontally disposed housing enclosing the operating mechanism of the washing machine, said housing extending into the remaining corner of the cabinet, said frame further including a plurality of upright supporting members one disposed in each of the corners of the cabinet and secured at their upper ends to said horizontally disposed members, and a caster disposed in each lower corner of said cabinet in substantial alignment with a said upright member and rigidly connected to the lower ends of the latter, whereby said washing machine is supported by said casters and said frame within and spaced from the vertical walls of said cabinet, and means on said frame secured to and supporting said cabinet at the lower end thereof.

7. The combination of a substantially rectangular cabinet including side walls, a washing machine comprising a tub and operating mechanism therefor disposed within the cabinet, a supporting frame for said tub and including a plurality of horizontally disposed members each extending into a corner of said cabinet and spaced from the side walls thereof, said frame further including a housing for said operating mechanism, said housing also extending into a corner of said cabinet and spaced from the side walls thereof, a plurality of upright supporting members one disposed within each of said corners and spaced inwardly from the cabinet walls, the upper ends of said upright members being secured to the outer ends of said horizontally disposed members and said housing for supporting the same, said cabinet further including a top horizontal wall extending inwardly from the side walls and bearing upon the upper rim of the washing machine tub, and a cushion member interposed between and contacting said top wall and the rim of the washing machine tub to seal the joint therebetween and prevent vibration being transmitted to the wall of the cabinet from said tub.

8. In combination with a washing machine including a cylindrical tub and a housing for the operating mechanism disposed beneath the tub, a frame for supporting said tub and housing and including said housing, said frame further including a plurality of upright members, a cabinet including vertical walls enclosing said tub, housing and frame and secured at its lower end to and supported by said frame, and bracket members secured to the lower ends of said upright members of said frame for supporting said tub and housing independently of said cabinet walls.

9. The combination of a substantially rectangular cabinet including a top wall having an opening therein and an integral downwardly extending flange defining said opening, a washing machine positioned within said cabinet and including a cylindrical tub open at its upper end and disposed with the upper rim thereof bearing against the lower portion of said flange, and a frame within the cabinet having its lower portion dimensioned for engagement with the floor, the upper end of said frame engaging and supporting said tub in engagement with said depending flange of the top wall of the cabinet.

10. The combination of a substantially rectangular cabinet including a top wall having an opening therein and a downwardly extending integral flange defining said opening, a washing machine positioned within said cabinet and including a cylindrical tub open at its upper end and disposed with the upper rim thereof bearing against the lower portion of said flange, a frame within the cabinet for supporting said tub in engagement with the opening in said top wall, and a base structure dimensioned for engagement with the floor and engaging at its upper portion said frame, whereby to support said frame and said tub within the walls of the cabinet.

11. The combination of a substantially rectangular cabinet having a depressed top wall, said wall having an opening therein and the margin of said opening turned downwardly to form a neck portion surrounding said opening, said neck portion having a flange at its lower end, a washing machine mounted within and independently of the cabinet and including a cylindrical tub open at its upper end and having a flange on its upper rim, said tub being disposed with its open upper end in alignment with said opening and with its flange adjacent the flange of said neck portion, a rubber cushion and sealing ring interposed between the flanges, and means within the cabinet for supporting said tub in contact with said rubber cushion, which in turn substantially supports the weight of said top wall.

12. The combination of a substantially rectangular cabinet having a depressed top wall, said wall having an opening therein and the margin of said opening turned downwardly to form a neck portion surrounding said opening, said neck portion having a flange at its lower end, a washing machine mounted within and independently of the cabinet and including a cylindrical tub open at its upper end and having a flange on its upper rim, said tub being disposed with its open upper end in alignment with said opening and with its flange adjacent the flange of said neck portion, a rubber cushion and sealing ring interposed between the flanges, means within the cabinet for supporting said tub in contact with said rubber cushion, which in turn substantially supports the weight of said top wall, the margins of said top wall overlying the upper edges of the cabinet walls, and a second cushion member interposed between said upper edges and the overlying edges of the top wall of said cabinet.

JOHN T. HUME.